United States Patent Office 3,448,583
Patented June 10, 1969

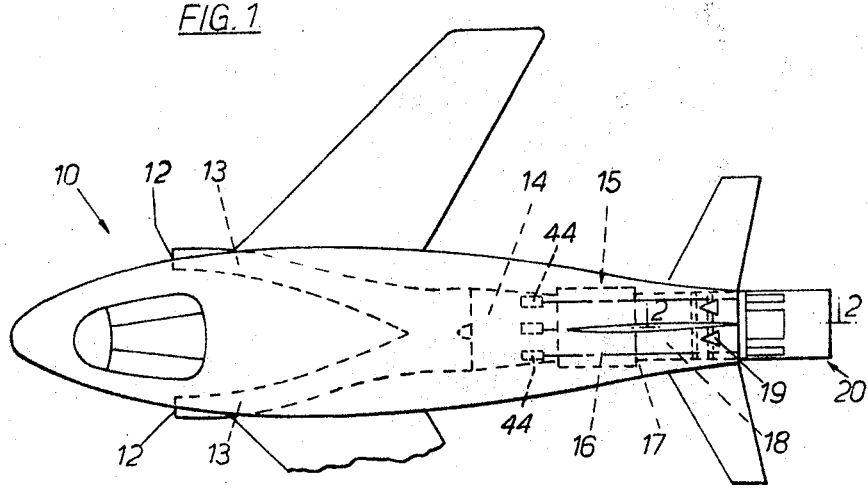

3,448,583
EXHAUST NOZZLES FOR JET ENGINES
Addison Charles Maguire, Alvaston, Derby, England, assignor to Rolls-Royce Limited, Derby, England, a British company
Filed Nov. 6, 1967, Ser. No. 680,768
Claims priority, application Great Britain, Dec. 23, 1966, 57,805/66
Int. Cl. F02k *1/06, 1/24*
U.S. Cl. 60—271      13 Claims

ABSTRACT OF THE DISCLOSURE

A jet engine exhaust nozzle which has a variable throat area, a fixed outlet area and apertures in structure between the throat and outlet, wherethrough ambient air may be entrained so as to fill what would normally be a low pressure area downstream of the throat and upstream of the outlet at low flight speed. The filling of the space prevents a too rapid expansion of the exhaust gas column and obviates the phenomena known as base drag.

---

According to the present invention, there is provided a jet propoulsion engine having an exhaust nozzle comprising an upstream portion with a variable area outlet, means for varying said variable area outlet, a fixed outlet area downstream portion rigidly connected to said varying means and adapted to move axially therewith relative to the upstream portion and a plurality of pivotable flap members positioned axially between said varying means and said downstream nozzle portion and radially outwards of said upstream nozzle portion, said flaps being adapted to selectively permit or deny access for ambient air, to the inner wall of said downstream nozzle portion.

Preferably said flaps are spaced symmetrically about the engine axis and have their upstream ends pivotally attached to the varying means.

Furthermore, said flaps are preferably biased towards a position radially outwards of the engine axis by mechanical means, so as to tend to deny access for ambient air to the said inner wall of the downstream nozzle portion.

Preferably said mechanical biasing means is adapted to collapse under the pressure exerted by ambient air on the external surface of the flaps when access is required for said ambient air.

Preferably means are provided whereby, when access of ambient air is not required, the mechanical biasing means is assisted in maintaining the flaps in the radially outward position.

Preferably said mechanical biasing means comprises springs or the like.

Preferably said assisting means comprises air bled from the engine compressor or air intake and ducted to the inner walls of the flaps.

Preferably, the variable area portion of the upstream nozzle portion comprises further flap members, the upstream ends of which are pivotally attached to the periphery of the downstream end of said nozzle portion.

Preferably, said means for varying said variable area portion comprises a duct member which has its downstream end thickened in section and formed into a substantially conical portion, said duct member being adapted to be moved axially by rams or the like, said conical portion being provided with rollers or the like, which are in rolling contact with the outer surfaces of the further flaps, the radial positions of the flap pivot axes relative to the flap/roller contact points being such that axial movement of the duct member in an upstream direction causes said flaps to pivot radially inwards, and movement of the duct member in a downstream direction permits said flaps to be pivoted radially outwards by the force exerted on their inner walls by the gas efflux.

The invention will now be described, by way of example only, with reference to the accompanying drawings in which:

FIGURE 1 is a diagrammatic plan view of an aircraft provided with a jet engine, the exhaust nozzle of which comprises one embodiment of the present invention.

FIGURE 2 is a diagrammatic part axial section on the line 2—2 of FIG. 1, drawn to an enlarged scale.

FIGURE 3 is an enlarged diagrammatic part axial section similar to FIGURE 2 but illustrating a slight modification to the means for moving the downstream nozzle portion of the exhaust nozzle.

In FIG. 1 an aircraft 10 has twin air intakes 12 in the sides of its fuselage. Preferably, air intakes 12 are designed so as to be suitable for sub-sonic and supersonic flight conditions. The air intakes 12 receive ambient air, which is then ducted, via ducts 13 to the compressor 14 of a jet engine 15. Jet engine 15 also comprises combustion equipment 16, turbine means 17, a jet pipe 18, reheat equipment 19 and an exhaust nozzle 20.

Exhaust nozzle 20 is comprised of two portions, an upstream portion 21, which has a variable area nozzle outlet 22, the variable portion comprising a plurality of flap members 23, pivoted at their upstream ends to and around the downstream extremity of jet pipe 18, and a downstream portion 24, which has a fixed area nozzle outlet. These portions are best seen in FIGURE 2.

The upstream end of nozzle portion 24 has a duct 29 with a conical portion 25, provided therebetween, the connection between said conical portion 25 and the downstream end of nozzle portion 24 comprising a plurality of strut members 26. Flap members 28 are positioned in each of the gaps defined by adjacent strut members 26, duct conical portion 25 and nozzle portion 24, said flaps being pivotally connected to the duct conical portion 25. Spring members 42 are provided and fitted in such a manner as to permanently urge flap members 28 radially outwardly as viewed in either FIGURE 2 or FIGURE 3, to a position wherein their outer surfaces lie substantially in line with the outer surface of nozzle portion 24.

The duct member 29 has a shoulder formed on it at a point upstream of the conical portion, thereby providing location points for the downstream ends of a plurality of rams 32 as shown in FIGURE 2 or ball screw and nut mechanisms 33 as shown in FIGURE 3 of which only one of each alternative is shown. The upstream ends of rams 32 or ball screw and nut mechanisms 33 are fixed to the outer surface of jet pipe 18.

Furthermore, duct conical portion 25 has a plurality of rollers 31 rotatably mounted on its inner wall, the number and spacing of said rollers being at least equal to and coincident with, the number and spacing of flap members 23.

OPERATION

When an aircraft which is powered by a jet engine incorporating an exhaust nozzle as described heretofor, is required to fly at a designed crusing speed, the outlet 22 of the upstream portion 21 of nozzle 20, will be adjusted so as to cause a restriction to the gas flow, as shown in FIGURE 2.

Rams 32 or ball screw and nut mechanisms 33 will be actuated by means, not shown, to move duct member 29 and nozzle portion 24 in an upstream direction, thereby causing rollers 31 to pivot flaps 23 inwards. The path along which the exhaust gas expands after leaving outlet 22 will be substantially as indicated by the chain-dotted line 36. In doing so, an annular space 38 is formed between the exhaust gas and the inner wall of nozzle portion 24, which space comprises an area of lower pressure than that of the exhaust gas.

The forming of said low pressure area is a direct causation of the phenomenon, known as base drag, to those skilled in the art.

Thus a plurality of flap members 28 are provided around the outer periphery of the conical portion 25 of duct 29. Said flap members 28 are pivotally connected at their upstream ends to the conical portion 25 and are spring biased radially outwardly by springs 42. However, the spring biasing by the springs 42 is such that when the said low pressure area is formed, pressure created by the flow of ambient air flowing along the fuselage of aircraft 10 onto the outer surfaces of flaps 28, is sufficient to overcome the spring bias and pivot flaps 28 inwardly, thus providing access for the ambient air, into said area.

Thus pressure is increased within said area and base drag substantially reduced.

In circumstances where the aircraft is required to accelerate rapidly and then maintain a high speed, reheat equipment 19 is brought into use so as to provide a substantial boost to the thrust produced by the engine. In order to cater for the increased volume of exhaust gas which is produced, rams 32 or ball screw and nut mechanisms 33 are actuated so as to move duct 29 and nozzle portion 24 in a downstream direction. The said movement releases the pressure of rollers 31 from flaps 23 on nozzle portion 21, and permits said flaps to be pivoted outwards by the force of the exhaust gases, thus increasing the outlet area 22 of nozzle portion 21.

Flaps 23 move outwards until the inner surfaces of nozzle portion 21, flaps 23 and nozzle portion 24 are substantially axially aligned. Thus it will be seen that the annular space 38 is eliminated, and with it, the base drag.

Flaps 28 are not now required to maintain their inward position, and since there is now no low pressure area adjacent their inner surfaces, the springs 42 force the flaps outwards, said springs being assisted in this operation by air bled from the compressor 14 by means 44 and ducted through duct 39 which is formed by duct member 29 and jet pipe 18, to the undersides of flaps 28.

I claim:

1. A jet propulsion engine having an exhaust nozzle comprising an upstream portion with a variable area outlet, means for varying said variable area outlet, a fixed outlet area downstream portion rigidly connected to said varying means and adapted to move axially therewith relative to the upstream portion and wherein a plurality of pivotable flap members are positioned axially between said varying means and said downstream nozzle portion, and radially outwards of said upstream nozzle portion, said flaps being pivoted radially inwards by ambient air pressure and radially outwards by pressure exerted by mechanical means.

2. A jet propulsion engine as claimed in claim 1 wherein said flap members are equi-angularly spaced about the engine axis.

3. A jet propulsion engine as claimed in claim 1 wherein said mechanical means comprises springs.

4. A jet propulsion engine as claimed in claim 3 wherein said springs are adapted to collapse when said flap members are subjected to positive pressure on their outer surfaces and substantially negative pressure on their inner surfaces, thereby permitting said flaps to pivot inwards towards the engine axis.

5. A jet propulsion engine as claimed in claim 3 wherein means are provided whereby said springs are assisted in pivoting said flaps outwards of the engine axis when said negative pressure is obviated.

6. A jet propulsion engine as claimed in claim 5 wherein said assisting means comprises air bled from the engine compressor, said air being ducted to the inner surfaces of the flaps.

7. A jet propulsion engine as claimed in claim 5 wherein said assisting means comprises air bled from the engine air intakes.

8. A jet propulsion engine as claimed in claim 1 wherein said variable area outlet of the upstream nozzle portion comprises further flap members arranged in overlapping relationship with each other circumferentially of the nozzle, each flap member having its upstream end pivotally attached to said nozzle.

9. A jet propulsion engine as claimed in claim 8 wherein means are provided for selectively causing said pivoting of the further flap members.

10. A jet propulsion engine as claimed in claim 9 wherein said pivoting means comprises rollers, rotatably mounted on the downstream nozzle portion structure and adapted to move axially therewith, said rollers when moved in an upstream direction, being caused to bear on the outer surfaces of said further flap members in such a manner as to cause said further flap members to pivot inwards towards the engine axis, and when moved in a downstream direction, permit said further flap members to be pivoted outwards of the engine axis, by the force exerted by the exhaust gases on their inner surfaces.

11. A jet propulsion engine as claimed in claim 10 wherein means are provided whereby said axial movement of the downstream nozzle portion is brought about.

12. A jet propulsion engine as claimed in claim 11 wherein said moving means comprises rams.

13. A jet propulsion engine as claimed in claim 11 wherein said moving means comprises ball screw and nut mechanisms.

References Cited

UNITED STATES PATENTS 3,048,973   8/1962   Benedict _____ 239—265.39
3,068,645  12/1962   Alford _____ 239—265.37

CARLTON R. CROYLE, *Primary Examiner.*

D. HART, *Assistant Examiner.*

U.S. Cl. X.R.

60—261, 264; 239—265.37, 265.39